United States Patent [19]

Schulz et al.

[11] 3,831,087

[45] Aug. 20, 1974

[54] BIOLOGICAL CELL ANALYSIS

[75] Inventors: Jurgen Schulz, Ulm/Donau; Hans-Jurgen Nitsche, Bellenberg, both of Germany

[73] Assignee: Licentia Patent-Verwaltungs-G.m.b.H, Frankfurt am Main, Germany

[22] Filed: Apr. 23, 1973

[21] Appl. No.: 353,768

[30] Foreign Application Priority Data
Apr. 16, 1973 Germany.............................. 2319247
Apr. 22, 1972 Germany............................ 2219778

[52] U.S. Cl. .......................................... 324/71 CP
[51] Int. Cl. ........................................... G01n 27/00
[58] Field of Search ............ 324/71 CP; 73/432 PS; 235/92 PC

[56] References Cited
UNITED STATES PATENTS
3,706,030  12/1972  Klein et al. ...................... 324/71 CP
3,745,455  7/1973  Haigh............................. 324/71 CP
FOREIGN PATENTS OR APPLICATIONS
864,075  2/1971  Canada........................... 324/71 CP

OTHER PUBLICATIONS

W. B. Taylor, "A Versatile Cell Detector for Cell Volume Measurements", Medical & Biology Engineering, Vol. 8, No. 3, 1970, pp. 281–290.

*Primary Examiner*—Alfred E. Smith
*Assistant Examiner*—Rolf Hille
*Attorney, Agent, or Firm*—Spencer & Kaye

[57] ABSTRACT

The observation of native biological cells, particularly blood cells, suspended within a test liquid according to a technique based on the discovery that the resistivity of native cells in the path of an electric current changes abruptly when a given current value is exceeded. The technique involves establishing an electric current within the test liquid, varying the magnitude of this current over a range encompassing such current value to cause a corresponding change in the resistivity of the test liquid, and monitoring the resistance of the electrical current path within the test liquid to detect and measure any resistivity changes.

25 Claims, 8 Drawing Figures

BIOLOGICAL CELL ANALYSIS

BACKGROUND OF THE INVENTION

The present invention relates to method for determining the physiologic properties of native, living biological cells, particularly blood cells, suspended in a test liquid and associated arrangements for practicing the method.

A known measuring process for electronically determining the volume of particles suspended in an electrolytic test liquid is the Coulter process. This process utilizes two vessels whose interiors are in communication via a small measuring opening. The liquid in one of the vessels is under a higher pressure so that the test liquid flows through this measuring opening from the vessel with the higher pressure into the other. An electrode is placed in the test liquid in each of the vessels and a potential difference is applied between the electrodes so as to establish an electric field extending through the measuring opening. An electrical measuring circuit is connected to the electrodes. The conductivity of the test liquid between the electrodes changes upon the passage of a particle through the measuring opening proportionally to the volume of the particle, thereby enabling the volume of the particles which are suspended in the test liquid to the determined.

The arrangement originally disclosed by Coulter for the practice of his method has since been further improved upon. In the German Published Patent Application No. 1,806,512, corresponding to U.S. application Ser. No. 309,662 by Reinhard Thom, filed on Nov. 27, 1972, an arrangement operating according to the Coulter method is disclosed in which the particles are not mixed into the electrolytic test liquid in the vessel in front of the measuring opening but rather are conducted to the measuring opening through a feed device especially provided for this purpose. This feed device has an exit opening spaced at a very short distance in front of the measuring opening so that the electrolyte flowing into the measuring opening sucks the particles out of the exit opening of the feed device. There then takes place a hydrodynamic focussing process which causes all particles to be analyzed to travel through the measuring opening, almost in the center of the opening. Such an arrangement produces a substantial increase in the measuring accuracy as compared to the accuracy obtainable with the arrangement originally disclosed by Coulter.

In determining the average cell volume of living cells, particularly for the determination of the average cell volume of erythrocytes in mammals, discrepancies have always been noted in practice between the results of the electronic volume determination according to the Coulter method and the results of the physical determination obtained through the use of a hematocrit and by performing a cell count. The measurement obtained utilizing the Coulter method provided too low of an evaluation of the cell volume. This discrepancy was originally attributed to the influence of the shape and deformability of the cells to be examined, which is clearly present, and the appropriate corrections were made to the measuring result. Even after these corrections were made, however, there still existed discrepancies of the above-mentioned type when measurements were made of native whole blood cells which are those lining cells as taken directly from the body without being processed in any manner. These discrepancies, however, did not appear in the measurement of fixed blood cells.

SUMMARY OF THE INVENTION

An object of the present invention is to provide a method and an associated arrangement for observing native biological cells, particularly living blood cells, suspended in a test liquid.

The method of observing the native cells includes detecting if such cells are present within the test liquid and additionally determining the physiological properties of such cells which are present.

The present invention is based upon the discovery that the resistivity of native cells is dependent upon the intensity of the current to which they are subjected. The resistivity of the native cells in fact has been found to noticeably decrease when the current intensity goes above a certain level.

Based on this discovery, this object is accomplished according to the present invention in that the resistivity of the test liquid is recorded as a function of the electric current flowing through the liquid, which current is varied between a series of discrete values of intensity. Those discrete current values along with the associated determined resistivity are utilized for further evaluation of the particles. The current is varied in a range encompassing the current value at which a change in the resistivity of the native cells would accur, such a change causes a corresponding change in the resistivity of the test liquid. The resistance of the electrical current path in the test liquid is monitored to determine the occurrence of such a change in resistivity.

In the practice of the present invention, the average cell volume of native cells determined by the measuring process is preferably recorded from either the peak value of the volume distribution curve or from the average of the distribution as a function of the electrical measuring current flowing through the measuring opening and a nonlinear relation between the average cell volume and the measuring current is determined as a measure for the desired property.

It has been mentioned above that in the particle volume analysis according to the Coulter process, current fluctuations are obtained which are approximately proportional to the volume of the particles upon the passage of the particles through the measuring opening. In carrying out this process, a potential difference is set up between the two electrodes disposed in the electrolytic test liquid on both sides of the measuring opening, so as to cause a certain current to flow through the electrolyte liquid from one electrode to the other electrode through the measuring opening. With a constant potential difference between the two electrodes this current intensity changes upon the passage of a particle through the measuring opening, due to the fact that the conductivity of a particle is different from the conductivity of the electrolyte surrounding the particle. Thus, basically, a certain electrical resistance is measured between the two electrodes which resistance changes when a particle is disposed in the measuring opening. This resistance is of course dependent on the type of electrolyte employed and on the type, size and number of the particles suspended in this electrolyte.

If the potential difference between the two electrodes is increased, the current through the electrolyte also increases linearly unless the conductivity of the electrolyte is changed by the heat produced by the existence of a stronger current.

In an analogous manner a constant measuring current can be set between the two electrodes whereupon the passage of a particle through the measuring opening causes a change in the electrical potential difference between the electrodes.

Corresponding to the increase in current in the electrolyte, the current differences in the measuring circuit caused by the passage of a particle through the measuring opening also increase. If latex particles were added to the electrolyte, for example, it can be noted that the changes in current increase linearly with the current in the measuring circuit.

If the ratio of current changes to the current in the measuring circuit is evaluated, the absolute resistivity of the measuring circuit, i.e., of the the electrolyte path in the measuring circuit, is no longer incorporated in the measurement. Influences from increases in temperature of the electrolyte are also eliminated by utilizing such a ratio in measuring the particles. Consequently, it is the relative change of the resistivity of the electrolyte path in the measuring opening that is evaluated.

As mentioned above, an arrangement operating according to the Coulter process is especially suited for determining the physiological properties of native cells according to the method of the present invention. If, for example, the measurements discussed above in connection with latex particles are made with native cells, we have noted that the ratio of the current change to the current values for a given type of particle, e.g., erythrocytes, is not independent of the specific value of the applied current. Consequently, the conductivity or the resistivity of the volume of the test liquid in the measuring opening in which a particle is contained is dependent upon the specific value of the applied current. This dependency of the resistivity on the current value for native cells provides an explanation for the above-mentioned discrepancy between native and fixed cells.

The above-mentioned current fluctuations are compiled in accordance with the Coulter process in the form of pulses. It is therefore necessary only to plot the pulse levels or their averages as a function of the current values in order to determine in which way the pulse levels are dependent on the set current value. It has been discovered that the amplitudes of these pulses initially increase linearly with the current values, beginning with a current value of zero. Starting with a certain current value, however, the amplitudes of the pulses no longer increase at the same rate as the current value but instead increase at a slower rate. When examining native blood cells and plotting the function in a graph it can be noted that each type of blood cell under examination produces a distinct break in the path of the curve. The position of this break in the curve characterizes properties of the cell membrane and the slope of the subsequent linear path is a measure of cell plasma conductivity. It has been found that these parameters of the curve different for the blood of different persons. It also has been found that the points of the breaks for cells of different sizes and for the various types of blood cells lie at different current values.

These phenomena, which do not occur with fixed blood cells, are apparently caused by a change in the isolation behavior of the blood cells at higher current values, i.e., at a higher field intensity to which the individual blood cell is exposed. This can be explained in that at such higher current values, ions probably break through the cell membrane which results in an increase in the conductivity of the blood cell under examination.

There is no record that this phenomenon occurring in the measurement of native cells, which is utilized according to the present invention in the determination of physiological properties of native cells, has ever been observed before. The failure to observe this effect may be partly becuase with the previously employed methods of conductivity examination of cells the high field intensities leading to the suspected ion breakthrough through the cell membrane did not occur. When measurements are made with an arrangement operating according to the Coulter process, however, the small dimensions of the measuring opening produce field intensities in the area of the opening of, for example, about 2 kv/cm with the application to the electrodes of relatively low voltages, for example, a potential difference between the two electrodes of 20 volts. The electrical current flowing through the measuring opening under such conditions is in the order of magnitude of about 1 mA. The energy converted to heat in the measuring opening is consequently relatively low.

An arrangement operating according to the Coulter process is thus particularly suited for use with the method of the present invention. In a particularly advantageous arrangement which operates according to the Coulter process, the particles are conducted toward the measuring opening through a specially provided feed device. The electrolyte in the vessel in front of the measuring opening is free of particles. The feed device has an opening facing the measuring opening. The particles emanating from this feed device are hydrodynamically focused into the center of the measuring opening by the electrolyte flowing through the measuring opening. In this connection, the distance of the exit opening of the feed device toward the measuring opening can be made relatively small, as disclosed in the above-mentioned U.S. Application Ser. No. 309,662, so that the electrolyte flowing into the measuring opening sucks the particles suspended in the feed device, i.e., the probe suspension, out of the opening of the feed device and the particles are accurately focused into the center of the measuring opening. The improvement in measuring accuracy attained by such a process of hydrodynamic focussing is substantial because almost all the cells are subjected to the same field intensity along the center axis of the measuring opening, so that a sharp bend in the resistivity curve is produced when the trancellular ion flow, i.e., current flow through the cell membrane, begins.

An arrangement for practicing the method of observing the native cells according to the present invention thus includes a novel combination of both a known arrangement, which operates according to the Coulter process with or without separate particle input, and a device for varying either the potential difference between the electrodes or the measuring current through the measuring opening. An evaluation device is preferably provided in the electrical measuring circuit for assisting in the detection of the amplitude of each of the pulses, i.e., the changes in current corresponding to the various cell populations present in the probe suspension. The evaluation device also makes it possible to determine the relationship between the pulse amplitudes and either the respective potential difference between the electrodes or the instantaneous measuring current. With the use of such an arrangement, the measuring process according to the present invention can be substantially automated.

As already mentioned, a change in the conductivity behavior of the cells takes place very suddenly. In the recorded curves this becomes apparent from the occurrence of a sharp break, or bend, therein. The value at which the break in a curve occurs and the slope of the linear path after the break, i.e., in the direction toward higher field intensities or higher measuring currents, respectively, provides information about the type and state of the various cells.

The slope of the curve above the break current, which occurs upon further increases in the measuring current, provides an indication of the inner conductivity of the cell and thus, for example, for red blood cells, a measure of the hemoglobin concentration. In making such an evaluation, it is sufficient to determine the pulse peak distribution and their averages at one measuring current value below and at two values above the break current.

Furthermore, it is advantageous in evaluating the pulses to proportionally reduce the pulse amplification with the increase in the measuring current and to register only a deviation from the linear relationship between the amplitude of the pulse and the value of the measuring current.

DESCRIPTION OF THE PREFERRED EMBODIMENTS

Figure 1:
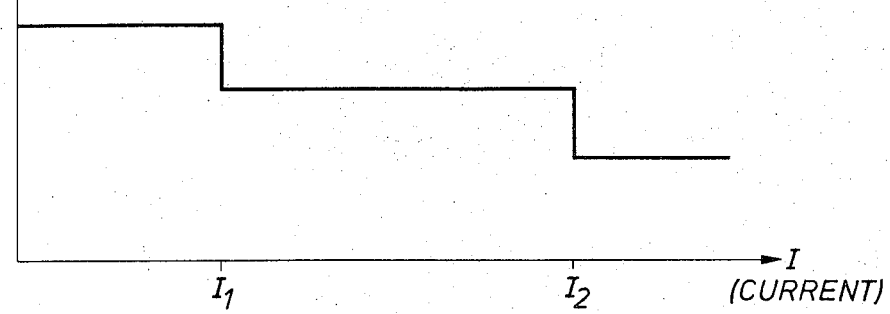
FIG. 1 is a graph showing an exemplary curve of the resistance for an electrolytic test liquid containing blood cells with respect to variations in the value of the applied current.

FIG. 1 shows a curve of the resistance for an electrolytic test liquid containing blood cells as it is recorded under given conditions with the application of various current intensity values. It can be seen that at different current intensities, which are marked $I_1$ and $I_2$ in FIG. 1, a sudden change occurs in the resistance. The reason for the occurrence of this phenomenon, as discussed above, is that the conductivity of the blood cells is increased at higher current intensities and thus, the resistivity of the entire test liquid is reduced.

Figure 2:
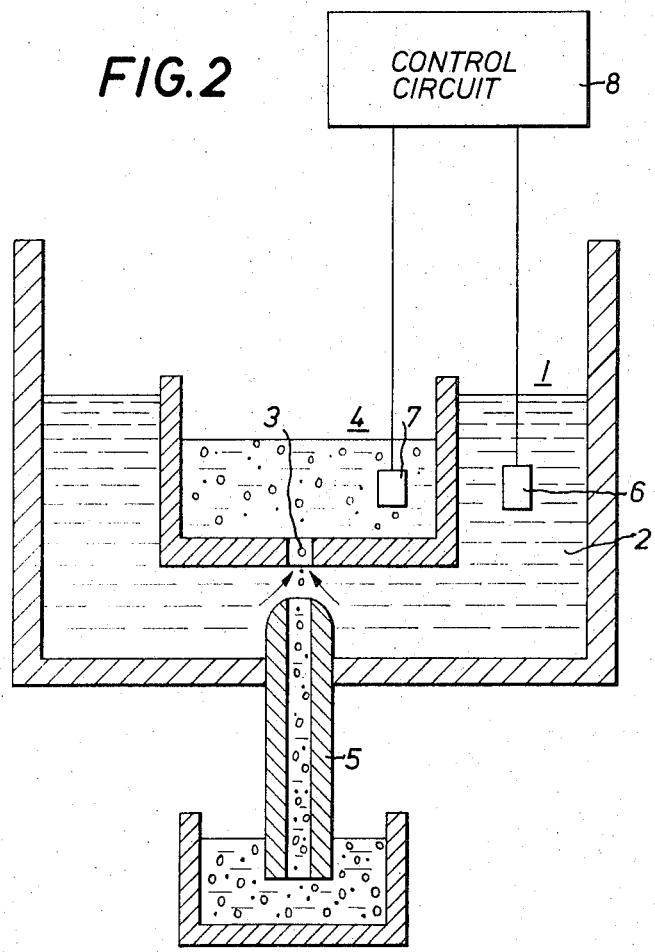
FIG. 2 is an elevational, cross-sectional view of an arrangement for use in carrying out the method of the present invention.

FIG. 2 shows an arrangement for observing the blood cells suspended in a test liquid which operates according to the Coulter counting process and utilizes a separate particle input source. From a vessel 1, electrolyte liquid 2 flows through a small measuring opening 3 into a vessel 4. At a small distance from the measuring opening 3, the outlet opening of a feed device 5, which contains a blood sample, is provided. The electrolyte liquid 2 flowing into the measuring opening 3 sucks the blood sample from this feed device upon passing by the exit opening of the feed device 5 and transports the blood through the center of the measuring opening 3. Electrodes 6 and 7 are disposed in the electrolyte liquid on opposite sides of the measuring opening. A control circuit 8 applies a potential difference across the electrodes 6 and 7, and also includes an electrical measuring circuit which is connected across the electrodes for measuring fluctuations in the electric field between the electrodes which fluctuations are produced by the passage of particles through the measuring opening 3. The basis of such an arrangement is disclosed, for example, in the above-mentioned U.S. application Ser. No. 309,662. In order to practice the method of the present invention, however, the control circuit 8 is constructed so that the current within the test liquid can be varied by directly varying either the potential difference or the measuring current between electrodes 6 and 7. The electrical measuring circuit of the control circuit 8 is capable of registering the current changes produced by the passage of particles through the measuring opening 3 at every set potential difference or every measuring current value so as to be able to evaluate these measurements with respect to the various types of blood cells. Furthermore, the control circuit 8 also stores information regarding the absolute or relative current fluctuations for the individual types of blood cells as a function of the potential difference or as a function of the measuring current between electrodes 6 and 7 and retains these parameters which are of significance for evaluating the individual cell properties based on the sudden change in the behavior of the current fluctuations.

The control circuit 8 of FIG. 2 includes either a current or voltage generator whose output values can be varied, preferably by remote control device or automatically, a preamplifier for preamplifying the pulses received from the detector and a pulse height analyzer. The pulse height analyzer can be of a conventional type provided with a main amplifier, MSLV1 1105/1 e.g. for further amplifying the pulse signals, an analog/digital converter MS Ad 1 1105/1 for assigning a numerical value to each of the pulse heights, a memory MS Sp 1 1105/1 for sorting and storing these numerical values, and a computer for computing the resulting digital distribution curve as well as possibly an oscillograph MS OS 1 1105/1, typewriter or printer MS DS 1 1105/1 for the direct display or recording of the distribution curve. Specifications of conventional units available on the market of main amplifier MS LV 1 1105/1, analog to digital converter MS AD 1 1105/1, memory unit MS SP 1 1105/1, oscillograph MS OS 1 1105/1 and typewriter, printer, recorder unit MS DS 1 1105/1 are given in Telefunken leaflets KB 123 E, KB 117 E, KB 114 E, KB 127 E, KB 130 E.

Figure 3:
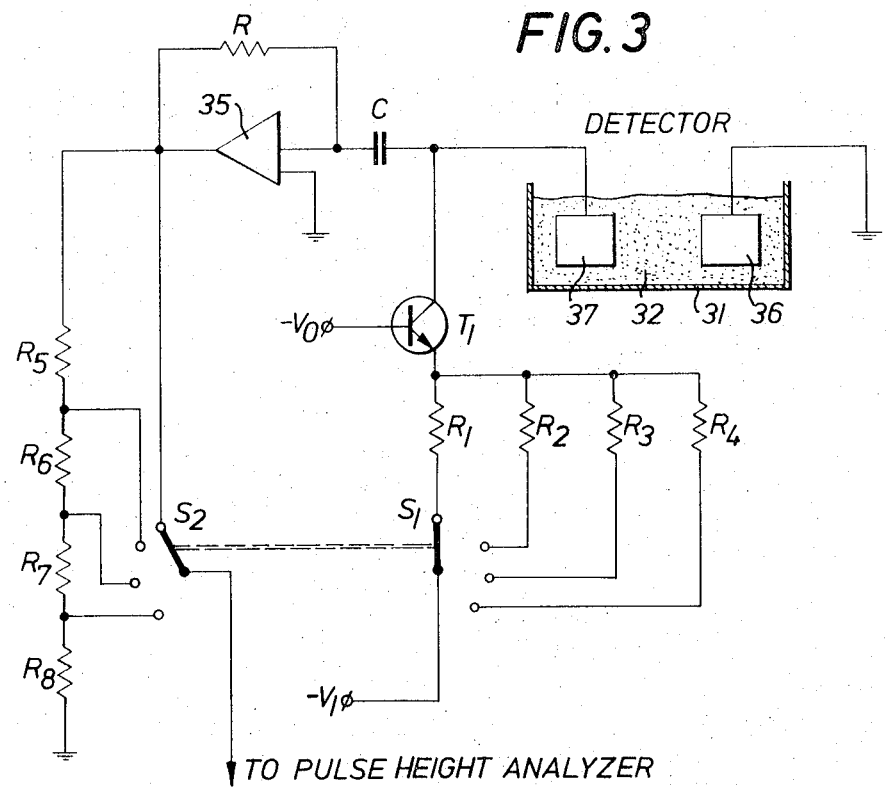
FIG. 3 is a schematic diagram of an embodiment for supplying the electrodes of the device of FIG. 2 with a variable current and for measuring the resulting pulses in accordance with the present invention.

One embodiment of a current generator for use in the control circuit 8 for supplying the cell detector with a measuring current which can be varied over a series of discrete values is shown in FIG. 3. This embodiment also includes a current sensitive preamplifier, the amplification of which can be varied via a connected voltage divider. Both the variations in the current and the variations in the amplification can be remotely or automatically controlled.

The circuit of FIG. 3 is capable of providing to the detector a series of discrete current values, each of which is held at a constant level independent of any changes in the conductivity of the electrolyte liquid due to temperature variations, for example. Consequently, with such an arrangement the temperature dependent electrolyte conductivity is not included in the measuring result. In this circuit, a constant current transistor $T_1$ is supplied with a fixed negative base voltage $-V_0$, which, for example, can be between $-30$ and $-100V$, so that the collector to base voltage of the npn transistor, or of an equivalent field effect transistor, is positive during the measuring operation and thus there is a high internal resistance at the collector which is necessary for the production of a constant current. The magnitude of the constant current is determined by the magnitude of the voltage at the emitter, $-V_1$, which, for example, can be between $-100$ and $-500$ V, the resistance value of the emitter resistor $R_1$, $R_2$, $R_3$ or $R_4$ and the emitter potential which is constituted by the sum of the base voltage $-V_0$ and the base to emitter voltage of the transistor $T_1$. It is advantageous to select the voltage $-V_1$ to be relatively high in order to keep the influence of the temperature dependent base to emitter voltage of $T_1$ on the magnitude of the measuring current relatively low.

In FIG. 3, only a simplified schematic illustration of the detector 30 is shown since only the direct current resistance is of importance for an understanding of the circuit. This direct current resistance is formed between the electrodes 36 and 37 which are immersed in the electrolyte 32 in vessel 31, which elements correspond to elements 6, 7, 2 and 1, respectively, of FIG. 2.

The signal is conducted from the electrode 37 via the coupling capacitor C of a current sensitive preamplifier while the electrode 36 is amintained at ground potential. The current sensitive preamplifier is preferably composed of operational amplifier 35 with a resistive feedback component R.

The remotely controllable and thus fully automatic adjustment of the measuring current for producing the desired different operating points of the detector can be obtained, in the embodiment shown in FIG. 3, with the aid of a remotely controllable switch $S_1$ in the form of a step relay, which switches various individual emitter resistors $R_1$, $R_2$, $R_3$ and $R_4$, having different resistance values into the circuit. It is also possible to control the current by changing the value of the direct voltage $-V_1$ from the direct voltage generation as well as by changing the base voltage $-V_0$, with the latter possibility being severely limited by the requirement for a sufficiently positive collector to base voltage for the constant current operation of the transistor $T_1$.

The remotely controllable and thus fully automatic adjustment of the pulse amplification according to the present invention may be effected, as shown in FIG. 3, with the aid of the voltage divider $R_5$, $R_6$, $R_7$, $R_8$, which is provided in the amplification path at the output of the preamplifier. The remotely controllable switch $S_2$ which determines how many of the resistors $R_5$ to $R_8$ are connected in the circuit is switched in synchronism with the switch $S_1$ which adjusts the measuring current, as shown by the dashed lines. The resistance values of the resistors $R_5$ to $R_8$ are such that the signal is amplified in inverse proportionality with the variations in the current. The divided pulse signal is then fed to the main amplifier input of a pulse height analyzer.

The adjustment of the pulse amplification can also be accomplished in other manners, for example by the selective use of various feedback resistances in the preamplifier, the use of variable resistance voltage dividers or the selective use of various feedback resistances in the main amplifier of the pulse height analyzer.

Figure 4:
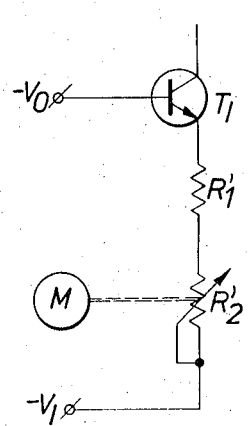
FIG. 4 is a circuit diagram of a modified portion of the embodiment shown in FIG. 3 in which a potentiometer which is driven by a stepping motor is utilized to vary the measuring current.

FIG. 4 shows a modification of the embodiment shown in FIG. 3 for adjusting the measuring current in a circuit with a constant current transistor $T_1$ where the emitter resistance is formed by a fixed resistor $R_1'$ for limiting the current and a potentiometer $R_2'$ which is remotely driven by a stepping motor M.

Figure 5:
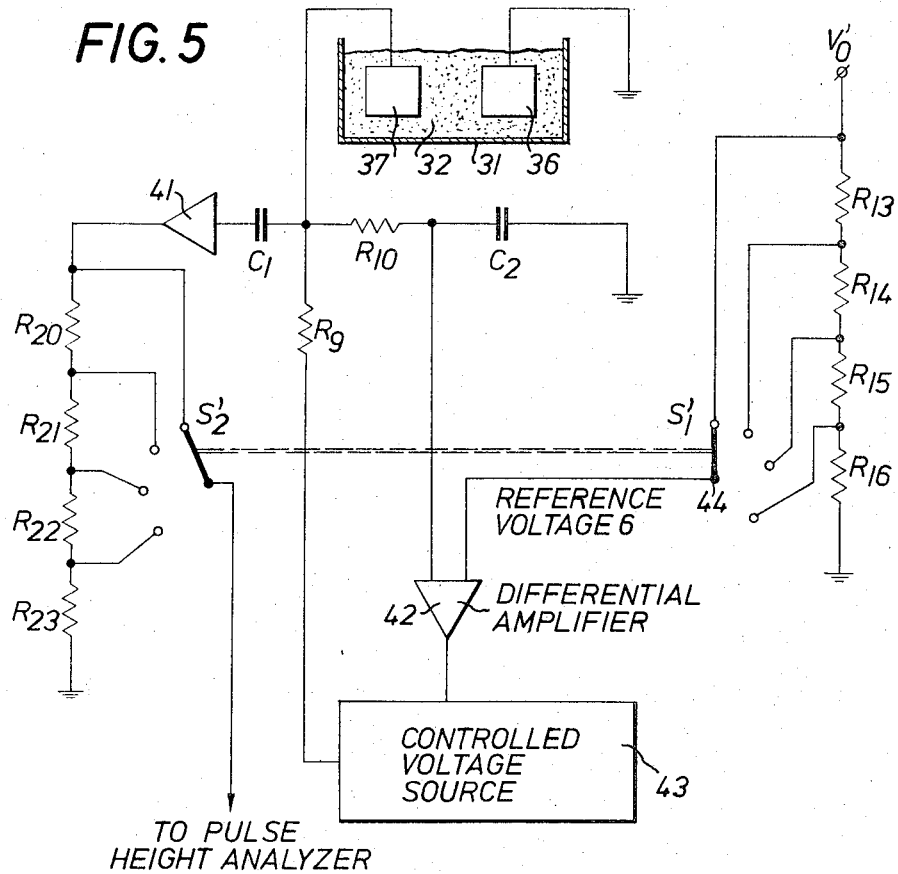
FIG. 5 is a schematic diagram of another embodiment of the present invention in which the current in the test liquid is varied by varying the potential across the electrodes.

Another embodiment for supplying the detector is shown in FIG. 5 where the influence of the temperature dependent electrolyte conductivity on the pulse levels is eliminated by the application of a constant voltage to the detector and the use of a voltage sensitive preamplifier. In this embodiment, the potential across the electrodes 36 and 37 can be varied over a series of discrete levels with the voltage at each level being maintained constant. The switching of the potential across the electrodes causes associated variations in the electrical current within the test liquid. The potential across the electrodes is indirectly controlled by varying a reference voltage at terminal 44.

This circuit provides a controllable direct voltage source 43 which produces, via an operating resistor $R_9$, a current flow through the detector, between the electrodes 36 and 37, which are immersed in the electrolyte 32 in the vessel 31. The actual measuring current in this circuit can be determined by measuring the voltage drop across the resistor $R_9$. In order to keep the detector voltage constant, i.e., independent of variations in the conductivity of the electrolyte, the voltage at electrode 37 is fed to a differential amplifier 42, via the resistor $R_{10}$, where this voltage is compared with the reference voltage. The output signal from amplifier 42 can then serve to regulate any possible difference between its two input voltages by controlling an adjustment in the controllable direct voltage source 43. In order to prevent the desired voltage fluctuation produced by the passage of a cell through the measuring opening from also being regulated out, the control circuit is made insensitive to rapid changes by means of the time constant $R_{10} \cdot C_2$.

Figure 6:
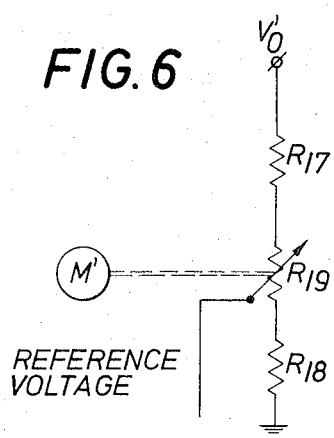
FIG. 6 is a circuit diagram of a modified portion of the embodiment shown in FIG. 5, in which a potentiometer which is driven by a stepping motor is utilized to vary the potential.

Consequently, the level of the voltage at the detector is determined by the reference voltage. The reference voltage is produced by voltage division of $V_0'$ via a variable voltage divider including the resistances $R_{13}$, $R_{14}$, $R_{15}$ and $R_{16}$ which are switched by use of a remotely controllable switch $S_1'$. The reference voltage could also be produced, as shown in FIG. 6, by use of a voltage divider using the resistances $R_{17}$, $R_{18}$ and the potentiometer $R_{19}$ which is remotely driven by use of a stepping motor M'.

FIG. 5 also shows the connection of the voltage sensitive preamplifier 41 via a coupling capacitor $C_1$ to electrode 37 in order to transmit the voltage pulses produced by changes in the resistance in the measuring opening due to the passage of the cells. The output of the preamplifier is again provided, as in the embodiment of FIG. 3, with a voltage divider including resistors $R_{20}$, $R_{21}$, $R_{22}$ and $R_{23}$ which are selectively connected via the remotely controllable switch $S_2'$ which is switched in synchronism with $S_1'$ in order to produce the synchronous adjustment of the pulse amplification before connection with the subsequent main amplifier of the pulse height analyzer. As in the embodiment of FIG. 3, the pulses are hereby amplified in inverse proportion with variations in the reference voltage.

Figure 7:
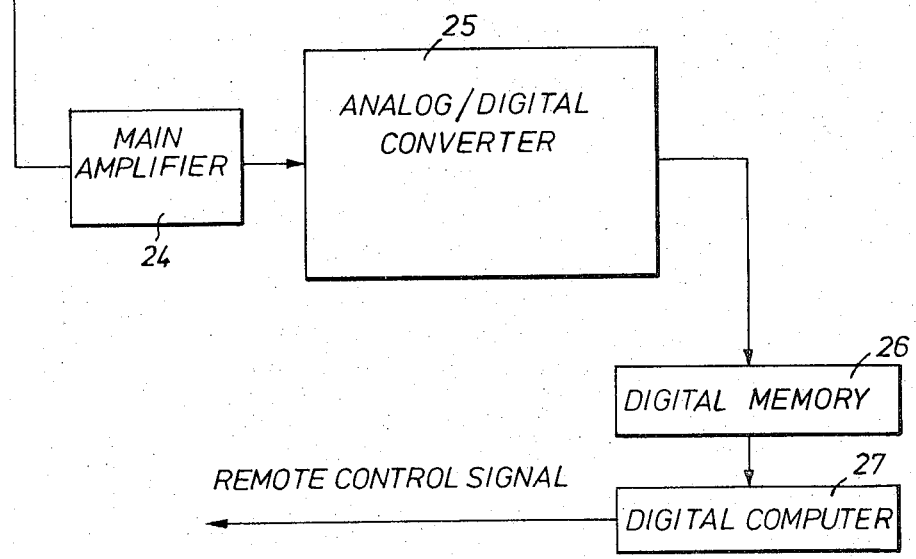
FIG. 7 is a block circuit diagram of an embodiment of a pulse height analyzer for use in the arrangement of the present invention.

The pulse height analyzer, which can be of any conventionally known type, includes, as shown in the block circuit diagram of FIG. 7, a main amplifier 24, an analog/digital converter 25, a digital memory 26 and a computer 27 for evaluating the measuring results. The digital memory 26 also can be provided with a known direct oscillographic display of the stored information, which feature is not of significance for the understanding and practice of the present invention and, therefore, is not shown in FIG. 7.

The main amplifier 24 brings the detector pulses from the preamplifier 35 or 41 to a height suitable for the subsequent analog/digital conversion, the analog/digital converter 25 converts the analog pulse height to a digital numerical value within a few microseconds, the digital memory 26 sorts these numerical values in that it additively registers a "one" for each occurring numerical value and displays in a clear manner the distribution function of the pulse heights. In the special case here under consideration of the cell volumes memory 26 displays the function as the store summed "ones," representing the cell count, over the magnitude of the numerical value from the analog/digital converter, representing the cell volume. This distribution function can be remotely requested from the computer 27, as shown in FIG. 7, for various values of the measuring current below and above the break current, and the associated distribution functions can be digitally transferred from the memory to the computer either on-line or off-line and can be subjected to fully automatic computation of the cell properties regarding the membrane and plasma contents. The computer also can automatically determine the break current and then determined the other measuring values in an optimum manner.

A semiautomatic or manual evaluation is of course also possible in carrying out the method of the present invention.

Figure 8:
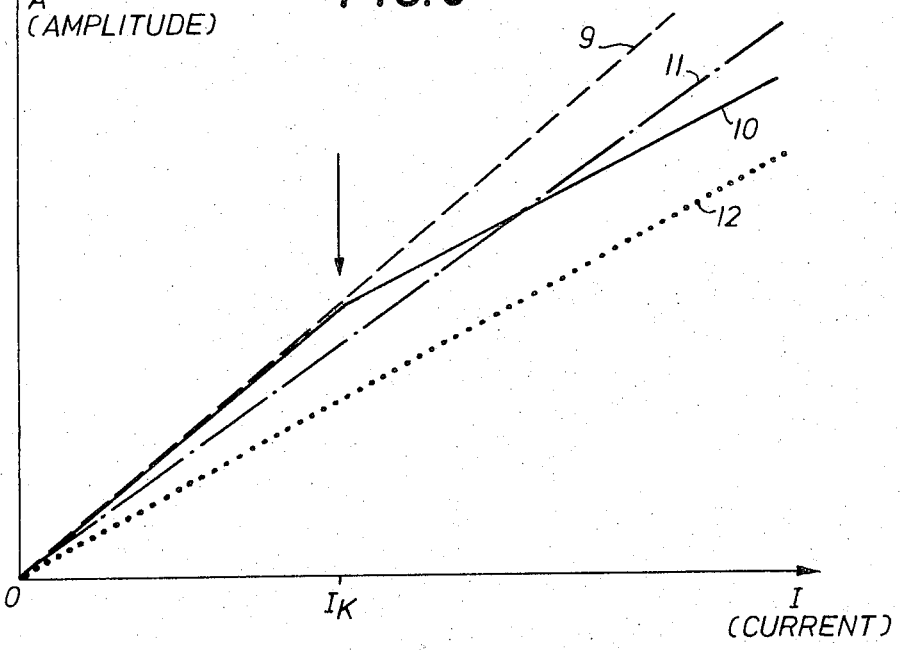
FIG. 8 is a graph containing exemplary curves of the fluctuations in current produced by the passage of various particles through the measuring opening in the arrangement of FIG. 2, with respect to variations in the current applied within the test liquid.

FIG. 8 shows the curve of the current fluctuation amplitudes A over current intensity I, the measuring current, for various kinds of particles which were examined with an arrangement employed in the practice of the method of the present invention. In this illustration, the dashed line, 9, indicates the previously expected curve for native erythrocites. It can here be noted that beginning with a certain current intensity $I_k$ this curve does not follow the expected path, in that the current fluctuation amplitudes A no longer increase at the same rate with further increases in the current intensity. A distinct break is formed in the curve at the point indicated in FIG. 8 by an arrow. The associated curve showing the new path is marked 10. The dot-dash curve 11 is that obtained when measuring fixed erythrocites. With these cells the above-mentioned effect does not occur, the current fluctuation amplitudes at the passage of the particles through the measuring opening increases linearly at a constant rate with the set current intensity. The dotted line 12, finally, is a curve obtained when measuring latex particles. These particles are completely neutral, thus the curve is completely linear. The latex particle spheres were 2.02 $\mu m_3$ in diameter which corresponds to a particle volume of 4.3 $\mu m$ and analyzed with an eight times higher amplification with respect to their smaller size in comparison to erythrocytes.

For native erythrocites - as already mentioned - the position of the point of break provides useful information about the membrane of the cell examined. The slope of the curve after the break provides information about the conductivity of the cell plasma which is a measure of the hemoglobin concentration of erythrocytes or the protein concentration of other biological cells. For native human erythrocites a typical break current value is 0.4 mA measured by use of a 40 $\mu m$ $\phi$ and 40 $\mu m$ long measuring opening and the plasma conductivity is two thirds of that of isotone electrolyte.

It will be understood that the above description of the present inventon is susceptible to various modifications, changes and adaptations and the same are intended to be comprehended within the meaning and range of equivalents of the appended claims.

We claim:

1. A method for observing native biological cells in a test liquid containing suspended biological cells, comprising the steps of: producing an electrical current within the test liquid; conducting a stream of biological cells along a portion of the path followed by the current; varying the magnitude of the electrical current, simultaneously with said step of conducting, between a series of discrete values over a range encompassing a current value at which a change in the resistivity of native biological cells occurs, resulting in a corresponding change in the resistivity of the test liquid containing the suspended cells; monitoring the resistance of the electrical current path within the test liquid; and providing an indication of the occurrence of such change in the resistivity of such native cells.

2. A method as defined in claim 1 wherein a series of at least three different discrete current values are produced within the test liquid, at least one value of which is below, and at least two other values of which are above, that at which a change in resistivity occurs.

3. A method as defined in claim 1 wherein said step of producing an electrical current within the test liquid is carried out by applying an electric potential between two electrodes.

4. A method as defined in claim 1 wherein said steps of producing an electrical current and of monitoring the resistance of the electrical current path are carried out as part of a Coulter measuring process during which said step of varying is carried out, a pulse analysis being effected for the resulting pulses for determining the resistivity of the test liquid, and in which the amplitude of each pulse is proportional to the current value corresponding to that pulse, and said step of monitoring includes determining the discrete current value at which the value of the proportional relationship between pulse amplitude and current value changes.

5. A method as defined in claim 4 for determining the physiological properties of the native cells, wherein said step of monitoring includes observing the change in he value of the proportional relationship between pulse amplitude and current value for measuring the conductivity of the cell plasma.

6. A method as defined in claim 4, further comprising the step of amplifying the pulses and varying the amplification of the pulses in at least an approximately inverse proportionality with changes in the current values.

7. An arrangement for observing native biological cells in a test liquid containing suspended biological cells, comprising, in combination: particle counting means for counting and classifying the cells suspended in the test liquid in accordance with the Coulter process, said counting means including two vessels for holding the test liquid, and having their interiors in communication with one another through a small measuring opening; means for producing a pressure difference between said vessels for causing the test liquid to flow through said measuring opening together with suspended biological cells from one vessel to the other; two electrodes, each immersed in the test liquid in a respective one of said vessels; electric potential applying means connected between said electrodes for producing a potential difference between said electrodes; electrical measuring means connected between said electrodes for measuring the current flowing between them; and means connected to said potential applying means for varying the magnitude of the electrical current in the test liquid, while the test liquid and suspended cells are passing through said opening, between a series of discrete values over a range encompassing a current value at which a change in the resistivity of native biological cells occurs, whereby the measurement produced by said measuring means provides an indication of the occurrence of such change in resistivity.

8. An arrangement as defined in claim 7 wherein the test liquid is an electrolyte solution.

9. An arrangement as defined in claim 8 wherein the electrolyte liquid in that one of said vessels which is at the highere pressure is substantially free of cell particles, and further comprising feeding means containing the cells to be counted and classified and having an exit opening disposed in that one of said vessels at the higher pressure, upstream of said measuring opening, for feeding cells into the flow of test liquid through said measuring opening.

10. An arrangement as defined in claim 9 wherein said electrical measuring means includes evaluating means for determining the amplitude of the pulses in dependence upon the various cell populations suspended in the test solution and providing an output signal indicative of the association of the pulse amplitudes with the electric current within the test liquid.

11. An arangement as defined in claim 10 wherein said means for varying the electrical current includes a transistor having its collector connected to one of said electrodes; and voltage means connected to the base electrode of said transistor for applying a variable voltage thereto.

12. An arrangement as defined in claim 11 wherein said voltage means include a voltage source and a voltage divider.

13. An arrangement as defined in claim 10 wherein said means for varying the electrical current includes: a transistor having its collector connected to one of said electrodes; and a variable resistance connected to the emitter of said transistor.

14. An arrangement as defined in claim 13 wherein said variable emitter resistance is a potentiometer connected to the emitter of said transistor.

15. An arrangement as defined in claim 14, further comprising a stepping motor for adjusting the setting of said potentiometer.

16. An arrangement as defined in claim 13 wherein said variable resistance comprises a plurality of resistors having respectively different resistance values and means for selectively connecting said resistors in the emitter circuit of said transistor.

17. An arrangement as defined in claim 10 wherein said means for varying the electrical current includes: a transistor having its collector connected to one of said electrodes; and voltage means connected for supplying a variable voltage to he emitter resistance of said transistor.

18. An arrangement as defined in claim 17 wherein said voltage means includes a voltage source and a variable voltage divider connected between said emitter and said voltage source.

19. An arrangement as defined in claim 10 wherein said means for varying the electrical current comprises: a differential amplifier having one input coupled to one of said electrodes; means for producing an adjustable reference voltage connected to a second input of said differential amplifier; and means connected to the output of said differential amplifier for providing a voltage to said one electrode which is regulated in response to the output of said differential amplifier.

20. An arrangement as defined in claim 19 wherein said means for producing a reference voltage includes a voltage source and a variable voltage divider connected between said source and said second input of said differential amplifier.

21. An arrangement as defined in claim 19 wherein said means for producing a reference voltage includes a voltage source, a potentiometer connected as a voltage divider across said voltage source and a stepping motor connected for driving the movable tap of said potentiometer.

22. An arrangement as defined in claim 10 wherein said electrical measuring means include amplifying means for amplifying the pulses in inverse proportion to variations in the electrical current in the test liquid, said amplifying means comprising: a preamplifier connected to one of said electrodes for receiving the pulses indicative of the cells passing through said measuring opening; a variable resistance voltage divider coupled to the output of the preamplifier; and means for varying the value of the resistance of said voltage divider in inverse proportion to variations in the electrical current in the test liquid.

23. An arrangement as defined in claim 22 wherein said electrical measuring means further include analyzing means coupled to the output of said preamplifier for analyzing the amplitude of the pulses.

24. An arrangement as defined in claim 10 wherein said electrical measuring means include amplifying means for amplifying the pulses in inverse proportion to variations in the electrical current in the test liquid, said amplifying means comprising: a preamplifier connected to one of said electrodes via a coupling capacitor for receiving the pulses indicative of the cells passing through the measuring opening; a variable resistance connected in the feedback path of said preamplifier; and means for varying the value of said variable resistance in inverse proportion to variations in the electrical current in the test liquid.

25. An arrangement as defined in claim 24 wherein said electrical measuring means further include analyzing means coupled to the output of said preamplifier for analyzing the amplitude of the pulses.

* * * * *